3,170,836
INJECTABLE COMPOSITIONS COMPRISING A COPPER-CONTAINING CHELATE COMPLEX COMPOUND DISPERSED IN A STABILIZED OIL-IN-WATER EMULSION AND METHOD OF USING THE SAME
Victor James Vergine, Eastcote, Middlesex, England, assignor to Glaxo Laboratories Limited, Greenford, England, a British company
No Drawing. Filed May 24, 1962, Ser. No. 197,291
11 Claims. (Cl. 167—53)

This invention relates to novel compositions for use in veterinary medicine to combat copper-deficiency in animals.

Copper deficiency in cattle and sheep occurs in many parts of the world and is associated with low concentrations of copper in the herbage. It has been proposed to combat this deficiency by injecting the animals either intramuscularly or subcutaneously with a copper-containing injection-fluid which would then maintain the desired blood level of copper.

Thus, for example, it has been proposed to inject a suspension of copper aminoacetate in an arachis oil/aluminium monostearate gel into cattle. Where this has been done, however, it has been found that the site of injection has become necrotic or oedematous due to irritation set up by the injected preparation and this appears to be particularly the case at intramuscular injection sites. Besides being in general painful to the injected animal, such tissue damage is clearly undesirable in meat animals.

I have now found that improved results, particularly reduced tissue reaction, may be achieved in the treatment of copper deficiency in veterinary medicine by the use of compositions comprising certain copper containing compounds dispersed in a stabilized injectable emulsion of a parenterally acceptable oil in water. The compounds which are used in conjunction with the above emulsion base are those which have a solubility in pure water at 20° C. of 0.5 to 2.0% weight/volume. Less soluble compounds appear to be ineffective while more soluble compounds tend to give toxic blood levels and disperse too rapidly. In addition it is found that ionizable copper salts which give free copper cations in water generally lead to toxic blood levels of copper and it is necessary that the copper should be in the form of a complex which is not substantially ionized in water to yield free copper ions at physiological temperature. Thus, for example, copper aminoacetate which is a suitable compound for use in these compositions is substantially free from cupric ions when dissolved in water whereas copper sulphate or other simple copper salts are considerably dissociated to give copper ions and are found to be toxic on parenteral administration.

According to the present invention therefore we provide compositions for parenteral administration to animals comprising a copper-containing chelate complex in which substantially all the copper is chelated, that is which does not substantially ionize in water to yield copper cations, and which possesses a solubility in water at 20° C. between 0.5 and 2.0% weight/volume, dispersed in a stabilized injectable emulsion of a parenterally acceptable oil in water.

The emulsions used in the compositions of the present invention are those which can be described as being stabilized and remaining substantially stable even following injection into muscle tissue. In experiments I have carried out, I find that many emulsions, when injected into living muscular tissue, rapidly break down into separate oil and water phases and necrosis or other tissue damage occurs when the separated aqueous phase no longer has the protecting action of the oil intended to delay release of the copper-complex; this phenomenon is noted even with emulsions which in vitro would normally be considered as quite stable. For the purpose of the present invention, therefore, I use emulsions which are stabilized, i.e., so formulated that they remain substantially stable for some time following injection into animal muscle tissue.

The injection preparations according to the invention cause substantially less tissue damage than injection-preparations hitherto prepared with oily bases and give rise to a more reliable and usually better uptake of copper.

The oil in water emulsion according to the invention will generally be prepared with the aid of parenterally acceptable wetting agents which serve to form and stabilize the desired emulsion.

As is well known, the formation of an oil in water emulsion as distinct from a water in oil emulsion involves suitable choice of wetting agent or agents, having regard to the relative proportions of the oil and water phases and their exact nature. The consistency of an emulsion and hence its suitability for injection is also dependent on its constituents. Thus for the purpose of the present invention it is necessary so to choose the constituents of the emulsion that an oil in water emulsion (as distinct from a water in oil emulsion) is formed and that its consistency is such that it can be injected. It is further especially necessary that the emulsion be stable and remain as an emulsion after injection into muscle tissue.

The wetting agents used in the preparation of the stabilized emulsion forming the base of the compositions according to the invention are preferably of the non-ionic type although ampholytic wetting agents also give good results. With non-ionic and ampholytic wetting agents, more reliable stability of the emulsion on injection is secured and there is less tendency for the wetting agent to be precipitated from the aqueous phase by salts present in physiological fluids than when a cationic or anionic wetting agent is used.

When using non-ionic wetting agents I have found it preferable to employ a two-component wetting agent system, one of the wetting agents serving primarily to form the emulsion and the second primarily to stabilize the emulsion once formed. As is known, for example, the water-soluble or preferentially water soluble wetting agents generally act as emulsifying agents whilst wetting or surface active agents which are oil-soluble (or preferentially oil soluble) are known generally to exert a stabilizing effect on emulsions and many different wetting agents are now offered on the market both for emulsifying and stabilizing purposes.

The following types of non-ionic wetting agents have been found to be particularly useful for the purpose of the present invention.

Type (a): Polyhydric alcohols, or their anhydrides, esterified with fatty acids, for example, sorbitan monostearate, propylene glycol monostearate, diglycol monostearate, mannitan mono-oleate, sorbitan sesquioleate, glyceryl monostearate, propylene glycol mono-oleate, propylene glycol monolaurate, diglycol monolaurate, diglycol mono-oleate, diglycol monopalmitate, diglycol monoricinoleate, pentaerythritol monostearate, pentaerythritol distearate, pentaerythritol dioleate, penaerythritol glycerol oleate, pentaerythritol dioleostearate, low-molecular polyoxyethylene oleate, glyceryl mono-groundnut acid ester, polyglyceryl monostearate, polyglyceryl-oleate, glycol monostearate, glyceryl mono-oleate, glyceryl monopalmitate and low-molecular polyoxyethylene monostearate.

The wetting agents of the above-type (a) are, in general, oil-soluble and hence suitable as stabilizing agents.

The following type, type (b), however, are generally water-soluble and so suitable as emulsifying agents.

Type (b): Polyoxyalkylene derivatives of esters of polyhydric alcohols, e.g., of esters of linear alcohols for example polyoxyethylene propylene glycol monostearate, polyoxyethylene glycol monolaurate, polyoxyethylene glycol mono-oleate, polyoxyethylene glycol monostearate or polyoxyethylene glyceryl stearate or polyoxyalkylene derivatives of esters of hexitans, e.g., polyoxyethylene sorbitan monopalmitate, polyoxyethylene sorbitan monolaurate, polyoxyethylene sorbitan trioleate, polyoxyethylene sorbitan monostearate and polyoxyethylene sorbitan mono-oleate.

Further types of wetting agents which may be of use include the following:

Type (c): Water soluble fatty acid esters of polyethylene glycol, for example polyethylene glycol 300 dilaurate, polyethylene glycol 300 monostearate, polyethylene glycol distearate and nonaethylene glycol mono-oleate, lower molecular polyglycol ricinoleate, lower molecular polyglycol monocaprate-caprylate, lower molecular polyglycol monolaurate.

Type (d): Fatty alcohols condensed with ethylene oxide, e.g., the material sold as Collone A.C. or Abracol S.W.

Wetting agents of types (c) and (d) are water-soluble and hence suitable as emulsifying agents. Type (c) wetting agents may, however, also exert some stabilizing action due to a bodying or thickening effect.

The stabilizing agents of type (a) are preferably used in conjunction with the emulsifying agents of type (b). Thus, one especially suitable combination is sorbitan monostearate with polyoxyethylene sorbitan monostearate while another is propylene glycol monostearate with polyoxyethylene glycol monostearate, advantageously combined with diglycol monostearate. The material Collone A.C. is preferably used in conjunction with sorbitan monostearate and/or low-molecular polyoxyethylene glycol monostearate.

The exact proportion of wetting agents to be used will depend on their nature. However, using a combination of non-ionic emulsifying and stabilizing agents, we find in general that from 0.5 to 1.5% of emulsifying agent in combination with from 0.5 to 4.0% of stabilizing agent gives satisfactory results. The ratio of emulsifying agent to stabilizing agent can thus vary between 3:1 and 1:8. It should be noted that too great a proportion of wetting agent—either of the emulsifying or the stabilizing type—is undesirable and may cause instability or even breaking of the emulsion or phase reversal.

Where the emulsion is prepared with the aid of ampholytic wetting agents, it is generally not necessary to use additional stabilizers. Such wetting agents include, in particular, the long chain N-substituted amino acids for example β-alkyl amino propionic acids available under the trade names of Amphionics H and D, Deriphats and Tegos and long chain betaines, e.g., dodecyl and hexadecyl betaines, available under the trade names of Ambiterics H and D, and Miranols. (Literature ref.: J. Soc. Cosmetic Chemists 11 (1960), 13–25, "Ampholytic Surface Active Agents," by C. D. Moore.) The proportion of ampholytic wetting agent in the emulsion is advantageously between 0.50 and 4.0%, preferably about 2.0%.

In the present specification, unless otherwise stated all proportions and percentages are by weight.

The proportion of oil to water is important and advantageously the proportion of oil to water in the emulsion should not be less than 30% and preferably not more than 65% by weight. Desirably the proportion of oil to water should be within the range of from 40–60%.

In order to determine the suitability of a given set of emulsion components for preparing a stable oil in water emulsion of suitable "thinness" for injection one merely blends the components in a homogenizer and leaves the emulsion so formed to stand for a prolonged period. Any tendency to separation or complete "cracking" can then be simply observed. Where there is doubt as to whether an oil in water or a water in oil emulsion has been formed, one can add a dye which is soluble in only one phase and examine to see whether the disperse or the continuous phase is coloured. Alternatively one can determine the conductivity of the emulsion which would be far lower for a water in oil emulsion than for an oil in water emulsion. The emulsion should be tested in vivo; for example, it may be injected into the muscle tissue of an experimental animal, e.g., a mouse, and, after some days, the animal sacrificed and the tissue surrounding the site of injection examined. If the emulsion is sufficiently stabilized there should be no substantial necrosis and usually there will be some of the emulsion still present.

The oils which may be employed to prepare the oil-in-water emulsions may comprise vegetable oils, for example arachis, olive, sesame, soya bean, castor and cottonseed oils as well as oily esters, e.g., ethyl oleate, dibutyl sebacate and isoamyl salicylate. However, I find that mineral oils of a pharmaceutical grade, e.g., liquid paraffin, preferably light liquid paraffin, are to be preferred as they in general, and surprisingly, cause even less tissue irritation than the vegetable oils. This I believe to be due to possible greater stability or mineral oil emulsions and hence less tendency for them to break after injection, the fine oil droplets being eventually dispersed by phagocytosis.

In the preparation of the injection preparation according to the invention it is convenient to prepare the oil in water emulsion by, for example, blending the oil, water and wetting agents in a homogenizer often at elevated temperature, for example, at about 60° C. and to mix this emulsion with the copper containing complex material in the desired proportions.

The final composition must not contain unwanted organisms and it is thus necessary to sterilize the various components of the composition. If the emulsion does not withstand heat sterilization it is possible to sterilize the oily and aqueous components before emulsification. In general, the oil may be sterilized by heating to about 160° C. for one hour while the aqueous medium may be sterilized in the autoclave at 15 lbs. pressure for 30 minutes. It is often possible to avoid the elevated temperature generally used in preparing the emulsions since, when a water soluble wetting agent, such as polyoxyethylene glycol monostearate, is added to the aqueous component and a more oil soluble wetting agent, such as propylene glycol monostearate, to the oil, it is generally possible to prepare the emulsion by blending at room temperature.

It is also possible to prepare the oil in water emulsions from a gel of the oil. The gelling agent is usually a metal soap of a long chain fatty acid, e.g., aluminium stearate, aluminium oleate, aluminium palmitate, lithium stearate, calcium oleate, etc. In general it is possible to use a somewhat lower proportion of oil in the emulsion when a gel is used. One suitable gel comprises arachis oil containing between 1.5 and 2.5% aluminium stearate.

In addition to reducing tissue reaction on injection the oil in water emulsions described above also render the uptake of the copper complex more consistent.

As indicated above, the copper-containing compound should be a complex which does not dissociate to a significant extent to yield copper cations and should possess a solubility within the stated range. One particularly effective compound fulfilling these requirements is copper aminoacetate.

Where the copper-containing complex is formed between copper and a compound able to form a complex with more than one metal cation, there is the possibility that, as the copper is utilized, the liberated complex forming compound will chelate calcium ions in the system, such ions being particularly easily chelated by many complex forming compounds. In order to reduce this undesired effect, any complex-forming functions residing in the copper complex after formation are preferably further complexed with calcium ions. Thus, for example, copper calcium ethylenediamine tetraacetate is an especially effective compound for use in the compositions according to the invention and is, in fact, more quickly and completely absorbed than copper amino acetate and is of lower irritance and toxicity. Chelate complexes containing copper and calcium formed from other polyalkylene polyamine polycarboxylic acids may be used.

It should be noted that copper calcium ethylene diamine tetraacetate exists in two forms, one of which is more soluble than the other. The more soluble form is found, however, to be converted to the less soluble on standing in aqueous solution and, therefore, if the compositions are not to be used immediately after preparation, either form of this compound may be initially incorporated into the preparation. The more soluble form does, however, possess a solubility lying above the range 0.5 to 2.0%, namely about 15%, and may not be suitable for compositions to be used immediately after preparation and before sufficient time has elapsed to allow the less soluble form to be produced. In general the soluble form is converted into the insoluble form by standing in water for several hours, e.g., overnight.

It should further be noted that, while the insoluble form of copper calcium ethylenediamine tetraacetate tends to settle out from aqueous suspension, and hence is difficult to use alone for injection into animals, the suspension of this compound is improved by the presence of the oil in water emulsions used in the present compositions.

While a suitable dosage of copper will vary with the degree of deficiency to be combatted and with the size of the animals to be injected, a suitable dose for cattle is found to be within the range 50 to 200 mg. conveniently about 100 mg.

In order that the invention may be well understood I give the following examples by way of illustration only:

EXAMPLE 1

*Formula*

|  | Percentage w./w. |
|---|---|
| Copper calcium ethylene diamine tetraacetate | 35.0 |
| Crill 3 | 1.95 |
| Crill 8 | 0.65 |
| Light liquid paraffin | 25.35 |
| Water | 37.05 |

*Method*

(a) The aqueous phase is prepared by adding the Crill 8 to the water. It is sterilized by autoclaving.
(b) The oil phase is prepared by adding the Crill 3 to the light liquid paraffin. It is sterilized by heating to 150° C. and maintaining this temperature for one hour.
(c) To the stirred aqueous phase is added gradually the soluble form of the copper compound with care that successive portions are adequately blended. Thickening of the suspension occurs due to conversion to the relatively insoluble form. Stirring is continued until this conversion is complete as judged by microscopical examination.
(d) The two phases are warmed to 60° C. and the oily phase added slowly to the aqueous phase, with brisk stirring. Agitation is continued until the preparation is cool.
(e) Sterilization of the final preparation is effected by stirring in an appropriate amount of Formalin, and after 24 hours, neutralizing it by the addition of sterile $Na_2S_2O_5$ solution.

EXAMPLE 2

*Formula*

|  | Percent |
|---|---|
| Amphionic H | 2 |
| Arachis oil | 48 |
| Water | 50 |

*Method*

The composition is prepared following the method used in Example 1. The aqueous phase (a) may be prepared by dissolving the Amphionic H in the available water and the solution sterilized by autoclaving. The oil phase (b) may be prepared by sterilization of the arachis oil by dry heat at 150° C. and maintaining this temperature for one hour. Subsequent process stages (c) to (e) are the same as in Example 1.

*Preparation of copper calcium ethylene diamine tetraacetate*

Suspend 584 g. of ethylene diamine tetracetic acid (EDTA) in 5 litres of hot water and, with stirring, add portion-wise 230 g. of basic copper carbonate, followed by 220 g. of calcium carbonate. Filter the solution whilst hot to remove excess calcium carbonate, and when cool, precipitate the copper calcium EDTA by stirring in 5.5 litres of ethyl alcohol. Filter the product, wash it with alcohol and dry it at 50° C. in vacuum. (Yield 850 g.)

This compound, which has a solubility of approximately 15%, can be converted to the insoluble form by dissolving it in water and allowing it to stand for some time, e.g., overnight.

| Analysis (soluble form): | Percent |
|---|---|
| Loss on drying at 105° C. | 0.3 |
| Copper | 14.6 |
| Calcium | 9.5 |
| Nitrogen | 6.4 |

The loss on drying figure for the insoluble form is about 15%. Nujol mull suspensions of the two forms show the following bands in the spectral region 1000–700 cms.$^{-1}$.

Soluble form 990, 968, 920, 868, 828, 708 cms.$^{-1}$.
Insoluble form 990, 976, 960, 932, 842, 772, 710 cms.$^{-1}$.

I claim:
1. A composition for parenteral administration to animals comprising a copper-containing chelate complex compound in which substantially all the copper is chelated and which possesses a solubility in water at 20° C. of between 0.5% and 2.0% weight/volume, said complex being dispersed in a stabilized injectable emulsion of a parenterally acceptable oil in water said emulsion containing from 30–65% by weight of said oil and being stabilized with a member selected from the group consisting of (1) a predominantly oil-soluble, non-ionic wetting agent to stabilize the emulsion and a predominantly water-soluble, non-ionic wetting agent as emulsifying agent and (2) an ampholytic wetting agent to stabilize and emulsify said composition.
2. A composition as claimed in claim 1 in which the complex compound is a copper calcium complex salt of ethylene diamine tetra-acetic acid.
3. A composition as claimed in claim 1 in which the complex compound is copper aminoacetate.
4. A composition as claimed in claim 1 in which the percentage of copper containing complex is between 10% and 70% by weight.
5. A composition as claimed in claim 1 in which the said oil is light paraffin oil.
6. A composition as claimed in claim 1 in which the predominantly oil-soluble wetting agent is a fatty acid ester of a polyhydric alcohol.
7. A composition as claimed in claim 1 in which the predominantly water-soluble wetting agent is a member selected from the group consisting of a polyoxyethylene derivative of an ester of a linear polyhydric alcohol, a polyoxyethylene derivative of an ester of a hexitan, a water-soluble fatty acid ester of polyethylene glycol and a fatty alcohol-ethylene oxide condensate.

8. A composition as claimed in claim 1 in which the composition contains 0.5 to 1.5% by weight of water-soluble wetting agent and 0.5 to 4.0% by weight of oil-soluble wetting agent.

9. A composition as claimed in claim 1 which contains at least one ampholytic wetting agent selected from the group consisting of long chain-N-substituted aminoacids and long chain betaines.

10. A composition as claimed in claim 1 in which the composition contains 0.5 to 4.0% by weight of an ampholytic wetting agent.

11. A method of combatting copper deficiency in animals comprising parenterally injecting into an animal a composition containing 50–200 mg. of copper in combined form, said composition comprising a copper-containing chelate complex compound in which substantially all the copper is chelated and which possesses a solubility in water at 20° C. of between 0.5% and 2.0% weight/volume, said complex being dispersed in a stabilized injectable emulsion of a parenterally acceptable oil in water, said emulsion containing from 30–65% by weight of said oil and being stabilized with a member selected from the group consisting of (1) a predominantly oil-soluble, non-ionic wetting agent to stabilize the emulsion and a predominantly water-soluble, non-ionic wetting agent as emulsifying agent and (2) an ampholytic wetting agent to stabilize and emulsify said composition.

References Cited by the Examiner
UNITED STATES PATENTS

| | | | |
|---|---|---|---|
| 2,055,083 | 9/36 | Klein | 167—82 |
| 2,515,898 | 7/50 | Rhodehamel | 167—85 |
| 2,675,343 | 4/54 | Clymer | 167—82 |

OTHER REFERENCES

Havinga: Rec. Trav. Chim. Pays-Bas, vol. 66, 1947, pp. 184–188.

Brendel: J. Am. Pharm. Assn., vol. 42, No. 3, March 1953, pp. 123 and 124.

JULIAN S. LEVITT, *Primary Examiner.*

M. O. WOLK, IRVING MARCUS, LEWIS GOTTS, *Examiners.*